June 29, 1937.  S. C. HAYWARD  2,085,192
EDGE ILLUMINATED INDICATOR
Filed June 30, 1936  2 Sheets-Sheet 1

Inventor
Sheldon C. Hayward
BY
Attorney

June 29, 1937.     S. C. HAYWARD     2,085,192
EDGE ILLUMINATED INDICATOR
Filed June 30, 1936     2 Sheets-Sheet 2
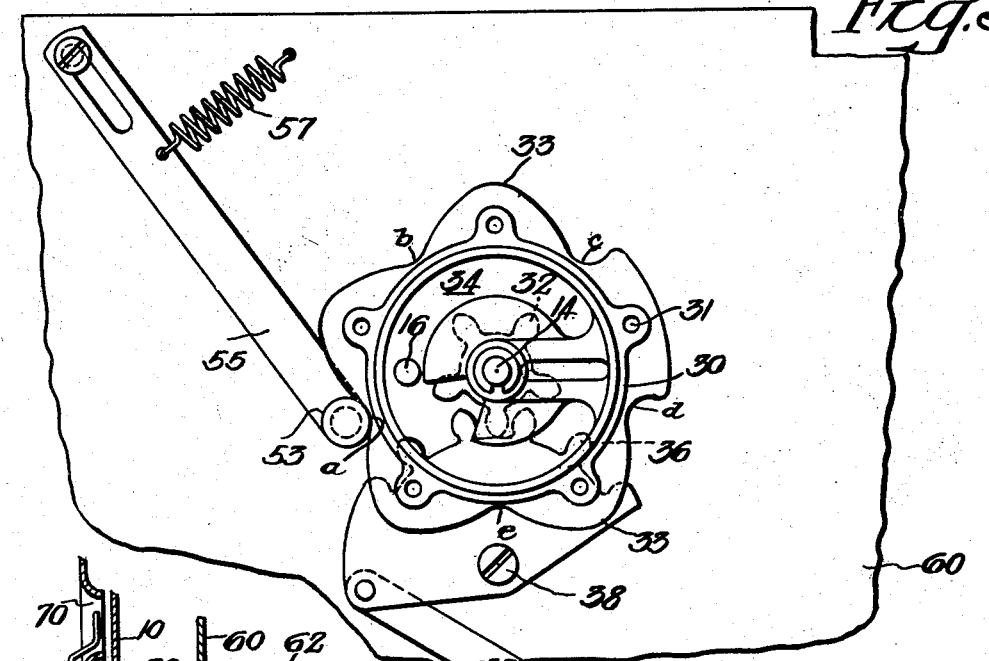
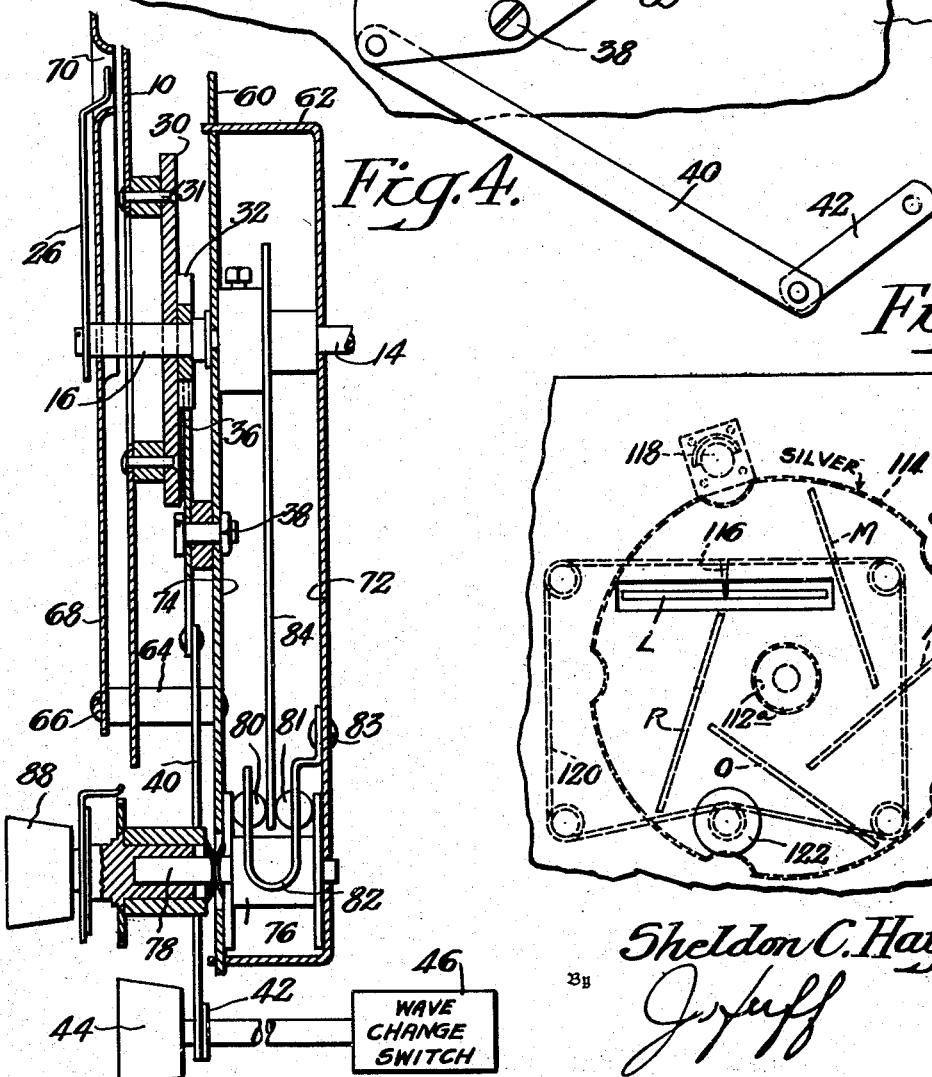
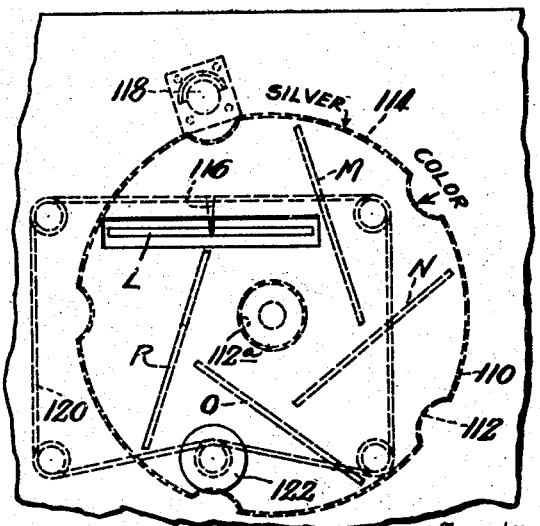
Inventor
Sheldon C. Hayward
By
Attorney Patented June 29, 1937

2,085,192

UNITED STATES PATENT OFFICE 2,085,192

EDGE ILLUMINATED INDICATOR

Sheldon C. Hayward, Merchantville, N. J., assignor to Radio Corporation of America, a corporation of Delaware Application June 30, 1936, Serial No. 88,178

9 Claims. (Cl. 116—124.1)

This case is an improvement upon application Serial No. 36,901, of Sheldon C. Hayward, filed August 19, 1935.

The present invention relates to multi-scale indicators, particularly to multi-scale tuning indicators for radio apparatus, and has special reference to the provision of edge lighting means for tuning indicators of the type wherein but one band scale is visible at a given moment.

Modern radio receivers frequently employ from three to five frequency bands. It is desirable, in order to avoid confusion, that but one band scale, indicative of the particular frequency range in use, be visible at a given moment. To this end it has previously been proposed that the several scales be printed or otherwise marked upon a rotatable drum, or a dial, or upon a movable curtain and drum or dial revolved or the curtain shifted, as the case may be, to present the different scales to view as the inductance or capacitance of the circuit is changed in discrete steps by means of a multi-position switch.

In order to provide a positive indication of the particular frequency range in use, the several parts of the surface upon which the scales are marked have been variously colored to give the indicia of each scale a distinctive background. Usually the multi-colored surfaces upon which the scales are marked are translucent and are illuminated from the rear. Aside from the difficulty and expense incident to the manufacture of satisfactory multi-colored translucent scale-bearing surfaces, prior art indicators are open to the objection that the illuminating means occupy space in the cabinet which might be otherwise usefully employed, and further, are not readily accessible for purposes of mounting, inspection, and replacement. The prior art also suggests colorless or uniformly colored backgrounds with distinctively colored scale indicia printed thereon. One objection to this scheme is that inaccuracies in registering the impressions, required to mark the several colors, may introduce inaccuracies of calibration on one or more of the scales.

A principal object, therefore, of the present invention is to provide an inexpensive, compact, and troublefree color-illuminated multi-scale indicator.

Another object of the invention is to provide novel means for color-illuminating a multi-scale indicator from a point adjacent an edge thereof.

Another object is to provide a preferably uncolored surface having a plurality of scales thereon, said surface having its peripheral edge marked in colors individual to the said scales.

Certain details of construction, together with other objects and advantages of the invention, will be apparent and the invention itself will be best understood by reference to the following specification and to the accompanying drawings, wherein:

Fig. 3 is an elevational view of an appropriate mechanism for rotating the dial of Fig. 1 to selectively frame its scales.

Fig. 4 is a vertical sectional view of an appropriate mechanism for moving the frequency indicating pointer of Fig 2.

Fig. 5 is a front elevation of another embodiment of the earlier Hayward device having linear scales with an appropriate device therefor, and adapted to be edge illuminated, in colors, in accordance with the system of the present invention.

Like reference characters represent the same in corresponding parts in all figures.

Figure 1:
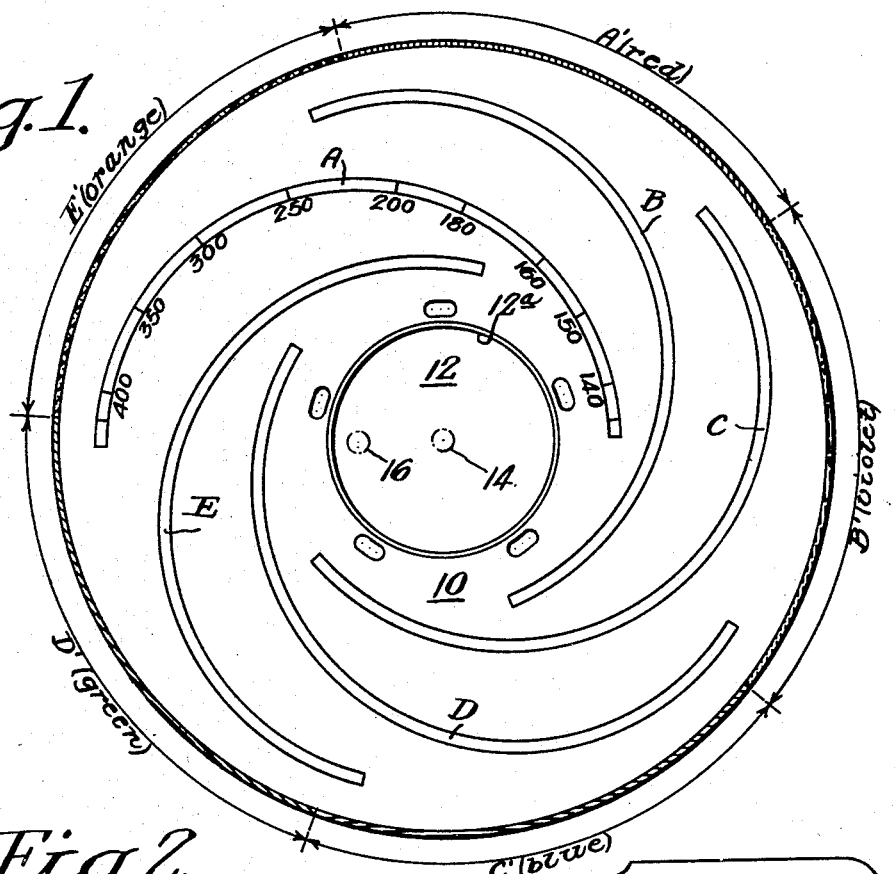
Fig. 1 is a front face view of a multi-scale dial, having the scales arranged thereon in the manner described in the above identified application of Hayward, and having its peripheral edge marked in colors specific to the individual scales.

Referring to Fig. 1, a dial in the form of an annulus or disc is designated generally by reference numeral 10. The dial 10 is formed of a flat sheet of clear glass, transparent resinous material, or other suitable substance. The dial is orificed about its inner periphery, as at 12, to facilitate attachment to a dial hub (30, Fig. 3) having an axis of rotation 14 perpendicular to the plane of the drawings. This axis 14 is offset from a second axis 16 which, as hereinafter more fully described, carries a frequency indicating pointer 26 (see Fig. 2).

A face, preferably the back face of dial 10 is printed, etched, or otherwise marked with a plurality of separate scales, A, B, C, D, and E, corresponding in number to the frequency ranges or bands through which the radio apparatus is capable of being tuned. If desired, the back face of the dial may be coated or separately masked to obscure the interior of the set. These scales are preferably of arcuate contour and may, as shown in Fig. 1, extend a full 180°, and they are eccentrically disposed about the dial to ensure proper registration with the aperture 70 in the escutcheon (68, Fig. 2) through which they are selectively viewed. Accurate registration is ensured when the radial centers about which the several scales are circumscribed fall upon the circumference of a circle whose radius is equal to the distance between the tuning pointer axis 16 and the axis 14 about which the dial rotates.

The outer peripheral edge of the dial or disc 10 is divided into a number of segments A', B', etc., corresponding to the number of separate scales on its surface—in this case, five. Each segmental portion of this edge is allotted a different color. Thus, if it is desired to so illuminate the several scales that when selectively viewed through the escutcheon frame of Fig. 2, scale A will be red, scale B violet, scale C blue, scale D green, and scale E orange, the correspondingly designated peripheral portions of the dial are lacquered, dyed, or otherwise treated with transparent coloring matter of the same respective colors.

Figure 2:
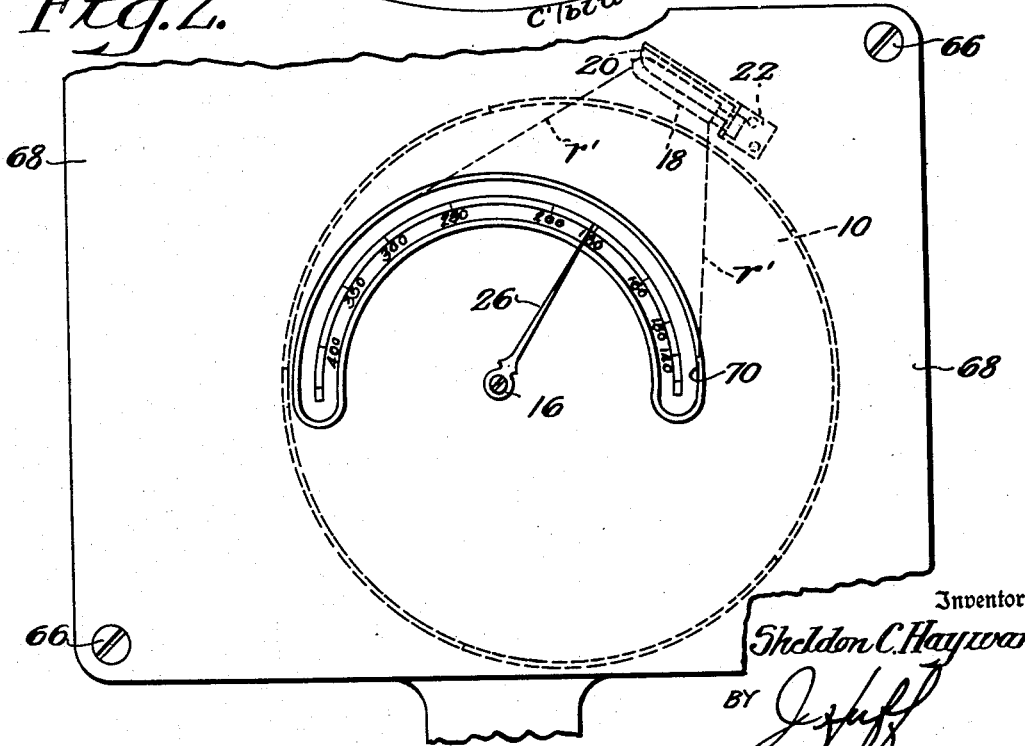
Fig. 2 is a front elevation of an indicator employing the dial of Fig. 1 with the frame, in which the edge illuminated dial scales of Fig. 1 are selectively viewed, and the tuning pointer, in position.

As shown in Fig. 2, a lamp 18, provided with a suitable reflector 20 and supported on a bracket 22 adjacent the colored peripheral edge of the dial 10, directs its rays into the transparent scale-bearing body portion of the dial. The inner peripheral edge 12ᵃ of dial 10 is preferably silvered or otherwise treated to reflect the rays from lamp 18 back into the body of the dial.

With the dial 10 in the position required to frame a selected scale (say scale A) in the aperture 70, light from lamp 18 transmitted through the (red) colored edge may tint not only the selected scale (A) but also other portions of the dial. This, however, is obviously of no moment, since but one scale is visible at a given time. As indicated by the dotted lines r and r' in Fig. 2, the colors are so positioned on the dial's edge with respect to the several scales and with respect to the lamp 18 that a selected scale (A) viewed through the aperture is illuminated in a color (red) individual thereto.

The mechanism for rotating the dial 10 about axis 14 and the mechanism for rotating the tuning pointer 26 about its axis 16, may be of any suitable or convenient type. Thus, referring to Fig. 3, the dial is secured about its inner periphery as by rivets 31 to a hub 30 which is disposed for rotation upon axis 14, offset from the pointer carrying tuning shaft 16. Hub 30 comprises a pinion 32 surrounding axis 14 and a cut-away portion 34 providing clearance for the terminal section of the pointer-carrying tuning shaft 16.

A driving gear sector 36, pivoted as at 38, cooperates with pinion 32 to rotate the dial hub; torque is applied thereto through levers 40 and 42 which, as shown in Fig. 4, are actuated by turning the knob 44 of a wave-change switch 46. The hub 30 has a number of rounded star-shaped cam surfaces 33 formed about its outer periphery. The peripheral sections of small radii constitute a series of detents a, b, c, d, and e (one for each scale on the dial) in which a cam follower roller 53 is adapted to rest. The cam follower 53 is mounted upon a freely pivoted arm 55 and serves not only to lock the dial hub 30 in a desired position, but to move it into such position by rolling pressure exerted through arm 55 by spring 57 if, inadvertently, the torque applied to hub 30 through gear 36 is more or less than that required to bring a selected scale in register with the escutcheon aperture.

Referring now to Fig. 4, 60 designates a back mounting plate, which may be conveniently supported by a frame 62 extending outwardly from the chassis or base of the receiving apparatus. Spaced therefrom, as by spacers 64 to accommodate the dial 10 and dial actuating mechanism, and secured by screws 66, is the front panel or escutcheon 68 having a suitable aperture or frame 70 (see Fig. 2) through which the dial scales are selectively viewed. The back mounting plate 60, frame 62, and escutcheon 68 are suitably orificed to accommodate the terminal section of the main tuning shaft 16 to which the frequency indicating pointer 26 is fixed.

Frame 62 is bent over to form a U-shaped member, the right side wall of which is designated 72 and the left side wall, formed by the back of mounting plate 60, 74. A spool 76 is fixed on a shift 78 which is journaled in these spaced parallel walls 72 and 74.

Complementary rotor elements, in the form of balls 80 and 81, are supported between the ends of the spool 76 and on the same side of the axis of rotation of the latter in line, parallel to the axis. The supporting means for the balls 80—81 is in the form of a U-shaped retainer 82 fixed to the frame 62 by rivets 83 and provided in the U with circular holes in which the balls have a free running fit.

In assembling the device, the edge of the disc 84, fixed on the main tuning shaft 14, is inserted between the balls 80—81. The distance between the spool ends is made slightly less than twice the diameter of one of the balls plus the thickness of the disc 84, so that insertion of the edge of the disc between the balls may be forced, whereupon the spool ends are flexed slightly outwardly. With the parts assembled, therefore, the balls 80—81 are held in frictional driving engagement with the opposite faces of the disc 84 and the frictional driving surfaces of the spool ends by the spring action of the latter. Interstation tuning is accomplished by rotating the shaft 78 by means of the knob 88 fixed thereon.

As previously indicated, a desired band is selected by means of the knob 44 on wave-change switch 46. Movement of this knob actuates the previously described lever and gear arrangement and rotates the dial the number of degrees required to frame the corresponding scale in the escutcheon aperture. With the selected scale properly framed, the colored edge portion individual to this scale may be said to be in register with the edge illuminating lamp 18.

Referring to Fig. 5. To ensure optimum illumination over the entire area of the dial spanned by the selected scale, the edge of the dial here designated 110 may be concavely cut away at spaced points 112 about its periphery to better overcome the converging effect of refraction at the convex edge of the disc, thereby giving better dispersion of the light from lamp 118 throughout the dial. In this case the color is preferably contained within the cut-away portions 112, and the peripheral edges 114 between the colored "lens" portions, silvered to reflect the light. As described in connection with Fig. 1, the inner peripheral edge 112ᵃ of the dial may likewise be silvered. If desired, the entire surface of the silvered and colored edge portions may be roughened as by sand-blasting or knurling to further augment their light distributing characteristic.

The scales L, M, N, O, and P, of Fig. 5, are linear and the pointer and pointer-moving mechanism are of a convenient type suitable for use with such scales. A traveling pointer 116, fixed to a taut cord or belt 120, is adapted to be moved across the scale upon movement of pulley knob 122 which may conveniently be geared to be driven by the main tuning shaft. The dial moving mechanism (not shown) may be similar in all respects to that shown and described in connection with the embodiment of the invention shown in the other figures.

It is to be understood that the invention is to be in no wise limited by the particular dial and pointer-moving mechanism above described. Obviously, the invention may be practiced in connection with drum type and curtain type scale-bearing dials with only such modifications as will suggest themselves to those skilled in the art. It is to be understood, therefore, that the foregoing description of a preferred embodiment of the invention is to be interpreted as illustrative and not in a limiting sense except as required by the prior art and the spirit of the appended claims.

What is claimed is:

1. A multi-scale indicator comprising a scale bearing, transparent surface having a plurality of discrete, colored edge portions, means disposed adjacent said edge for edge-illuminating said surface, an escutcheon having an aperture through which one of said scales may be viewed, and means for selectively framing said scales in said aperture and concomitantly registering a selected one of said colored edge portions with said edge illuminating means.

2. The invention as set forth in claim 1 wherein the number of colors on said edge corresponds to the number of scales on said surface.

3. The invention as set forth in claim 1 and wherein said colored edge portions are spaced one from another and the intermediate edge portions are silvered to direct light from said illuminating means into the body of said scale bearing surface.

4. The invention as set forth in claim 1 and wherein the peripheral edge of said scale bearing surface is roughened to diffuse light from said illuminating means throughout said scale bearing surface.

5. The invention as set forth in claim 1 and wherein the edge of said transparent surface is provided with a plurality of concave notches to better disperse the light from said illuminating means throughout said scale bearing surface.

6. The invention as set forth in claim 1 and wherein the edge of said transparent surface is provided with a plurality of concave notches within which the colors are respectively contained.

7. A multi-scale indicator comprising a rotatable, transparent, scale-bearing dial having a plurality of discrete, colored edge portions, means disposed adjacent the peripheral edge of said dial for edge-illuminating the same, an escutcheon through which one of said scales may be viewed, and means for rotating said dial to selectively frame said scales in said aperture and to concomitantly register a selected one of said colored edge portions with said edge-illuminating means.

8. The invention as set forth in claim 7 and wherein said dial is in the form of an annulus having its inner peripheral edge silvered to reflect light from said illuminating means into the body of said annulus.

9. The invention as set forth in claim 7 wherein said dial is in the form of a circular disc with said scales eccentrically arranged on a surface thereof and wherein said colors are so positioned with respect to said scales and said illuminating means that a selected scale, viewed through said aperture, is illuminated with a color individual thereto.

SHELDON C. HAYWARD.